United States Patent
Praechter et al.

(10) Patent No.: US 6,240,585 B1
(45) Date of Patent: Jun. 5, 2001

(54) METHOD OF TREATING WASTEWATER FROM INDUSTRIAL LAUNDRIES

(75) Inventors: Roy A. Praechter, Cincinnati; David Tibbitts; Andrew J. Weber, both of Mason, all of OH (US)

(73) Assignee: Washing Systems, Inc., Cincinnati, OH (US)

( * ) Notice: Subject to any disclaimer, the term of this patent is extended or adjusted under 35 U.S.C. 154(b) by 0 days.

(21) Appl. No.: 09/324,313

(22) Filed: Jun. 2, 1999

(51) Int. Cl.[7] ................................................. D06F 39/02
(52) U.S. Cl. ............................... 8/158; 68/17 R; 68/902; 210/705
(58) Field of Search ...................... 8/158, 159; 68/17 R, 68/902, 208; 210/705

(56) References Cited

U.S. PATENT DOCUMENTS

| | | |
|---|---|---|
| 1,312,477 | * 8/1919 | Gray . |
| 4,609,488 | 9/1986 | Geke et al. . |
| 4,820,450 | 4/1989 | Wile et al. . |
| 4,855,061 | 8/1989 | Martin . |
| 4,867,886 | 9/1989 | Botkins, Jr. . |
| 5,006,231 | 4/1991 | Oblad et al. . |
| 5,076,937 | * 12/1991 | Montgomery . |
| 5,160,439 | 11/1992 | Dobrez et al. . |
| 5,167,829 | 12/1992 | Diamond et al. . |
| 5,183,562 | 2/1993 | Totoki et al. . |
| 5,246,590 | 9/1993 | Dobrez et al. . |
| 5,374,358 | 12/1994 | Kaniecki et al. . |
| 5,454,956 | 10/1995 | Pennaz . |
| 5,523,000 | 6/1996 | Falbaum et al. . |
| 5,529,696 | 6/1996 | Tibbitts . |
| 5,531,905 | 7/1996 | Dobrez et al. . |
| 5,807,487 | 9/1998 | Lahti . |
| 5,846,433 | 12/1998 | Sorensen et al. . |
| 5,849,100 | 12/1998 | Bowden . |
| 5,960,501 | * 10/1999 | Burdick . |

* cited by examiner

Primary Examiner—Frankie L. Stinson
(74) Attorney, Agent, or Firm—Wood, Herron & Evans, LLP

(57) ABSTRACT

Wastewater from a commercial laundry is treated by adding coagulant directly to the wastewater from each load of items washed. The amount of coagulant is administered using a controller. The controller in turn is programmed with an amount of coagulant which should be added based on the type of item being washed. The same controller can be used to inject the detergent into the washing apparatus. Thus the operator of the laundry simply enters the type of item being washed into the controller. This will automatically control both the amount of detergent added to the laundry as well as the amount of coagulant added to the wastewater discharged from the washing apparatus.

7 Claims, 1 Drawing Sheet

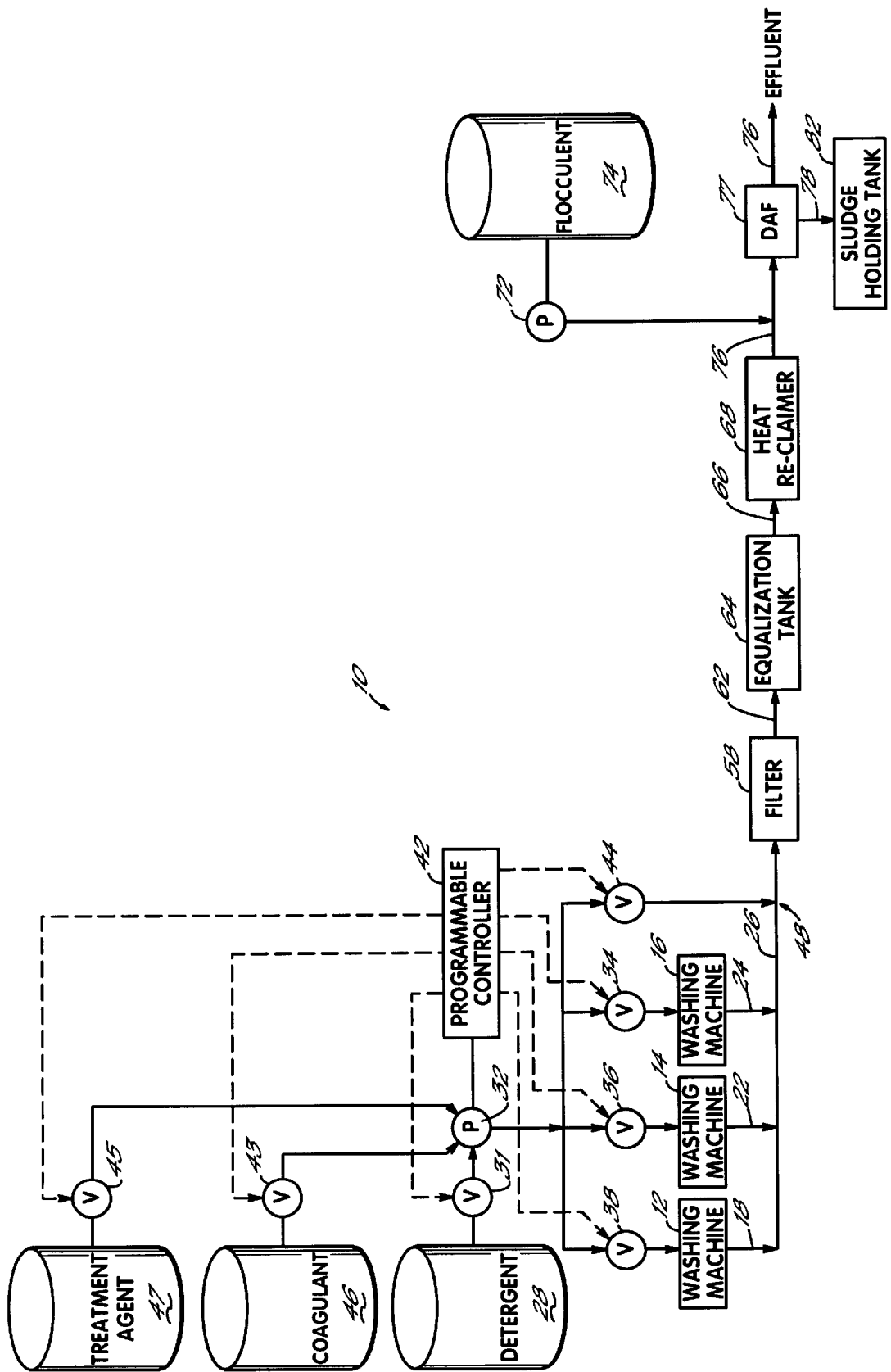

METHOD OF TREATING WASTEWATER FROM INDUSTRIAL LAUNDRIES

BACKGROUND

Generally the effluent from commercial laundries is not clean enough to be discharged directly into a public water treatment plant. It may include excessive concentrations of fats, oils, and/or greases (FOGs) as well as excessive concentrations of total suspended solids (TSS), BOD, COD, heavy metals, and VOC (volatile organic compound).

One of the problems encountered in treating wastewater from commercial laundries is that different loads of laundry may contain different effluent. For example, one load of laundry may be shirts while the next is pants. Another may be shop towels and another may be floor mats. These are all treated differently and the wastewater is different from each of these types of loads. For example, shop towels produce extremely high FOGs whereas shirts may produce relatively low FOGs and mats produce high TSS. Typically the wastewater from the separate batches of laundry are discharged into a common line which leads to an equalization tank or pit.

As the name indicates, this tank allows the wastewater to equalize thereby minimizing swings in effluent contaminant with varying wash loads so that only one treatment parameter is required. The water discharged from the equalization tank would then be chemically treated, clarified and discharged. Chemical treatment and particularly the addition of the correct amount of emulsion destabilizers or coagulants is particularly dependent upon the composition of the water in the equalization tank. It is undesirable to add too little. This would not effectively break up the oil and water emulsion. Adding too much coagulant increases costs and interferes with downstream treatment of the waste stream.

Typically the laundry operator will simply monitor the effluent from the equalization tank periodically and manually adjust the feed rate of the coagulant. This requires close attention and creates a tendency to add too much coagulant.

Other systems have been developed which continuously monitor the wastewater in an attempt to continuously control the amount of coagulant added. This is disclosed, for example, in Dobrez, U.S. Pat. No. 5,160,439. The problem with such systems is that they require continuous on-line monitoring of an oil/water emulsion. These oil/water emulsions tend to foul the test probes requiring cleaning and other maintenance and accordingly are less preferred.

Accordingly it is the object of the present invention to effectively add coagulant to the wastewater of a commercial laundry. Further it is an object of the present invention to add the coagulant in response to the contaminants of the wastewater as it is dispensed from a washing apparatus.

It is also an object of the present invention to directly add other water treatment agents such as peroxide, enzymes, acids or bases and heavy metal scavengers to the effluent as needed based on content of the wash load.

SUMMARY OF THE INVENTION

The present invention is premised upon the realization that the rate of addition of various water treatment agents can be carefully controlled in a laundry which washes batches of different types of items such as shop towels, shirt and pants. The amount of agent is controlled by adding the agent directly to the waste water discharged from each batch wherein the amount of agent metered for each batch is determined by the content of the wash load. Although various treatment agents can be added in this manner, the preferred treatment agent is a coagulant.

For example, shop towels produce an extremely oily wastewater and therefore the wastewater from a batch of shop towels would receive more coagulant than the wastewater from a batch of work shirts.

In a preferred embodiment a controller is used to meter the amount of detergent added to a particular batch. That same controller is used to meter the treatment agent added to the discharge from each batch. Thus the operator can simply indicate to the controller the type of article being washed. The controller will meter out the appropriate amount of detergent at the beginning of the wash cycle and the proper amount of coagulant when the effluent is draining. The particular amounts can be determined empirically and refined over time.

The objects and advantages of the present invention will be further appreciated in light of the following detailed description and drawings in which:

BRIEF DESCRIPTION OF THE FIGURES

The FIGURE is a diagrammatic depiction of the method of the present invention.

DETAILED DESCRIPTION

The following detailed description of the invention is set forth in the environment of a typical commercial laundry facility. However, practicing the present invention does not depend on all of the equipment referred to herein. Each laundry facility is unique having its own waste water treatment equipment.

As shown in the figure, a typical laundry unit 10 includes a plurality of different washing machines 12, 14 and 16 respectively. Each washing machine has a waste discharge line 18, 22 and 24 all of which lead to a central discharge line 26. The washing units are supplied with detergent from a detergent supply 28 connected to a pump 32 through a valve 31. Pump 32 transfers the detergent through the respective valves 34, 36 and 38 into the different washers. The pump 32 and valves 31, 34, 36 an 38 are in turn controlled by a programmable controller 42. This same programmable controller and pump 32 are used to open valve 43 or 45 and to transfer coagulant from a coagulant supply 46 or other treatment agent from a supply 47 to the discharge from the washing machines through valve 44 into line 26 at junction 48. Line 26 transports the effluent to a filter 58 which in turn communicates with the equalization tank 64 through line 62. Filter 58 is optional and can also be located on the discharge side of equalization tank 64.

The wastewater discharged from the equalization tank 64 is transferred via line 66 to a heat reclaimer unit 68 (which is optional). A pump 72 in turn transfers flocculent from a flocculent supply 74 into line 76 which in turn leads to a clarifier 77, in this case listed as a dissolved air floatation clarifier. Other types of clarifiers can be employed. Clarifier 77 will separate the water which is then discharged through line 76 to the sanitary sewer and the solid or particulate material which is discharged through line 78 to a sludge holding tank 82.

In practicing the present invention, the programmable controller 42 is preferably used to control both the amount of detergent which is added to the individual washing apparatus as well as the amount of coagulant and/or other treatment agent pumped into line 26.

As each individual washing machine is loaded with a type of item such as shop towels, mats, shirts and the like, the operator simply enters the type of material being washed into the controller 42. Controller 42 automatically activates pump 32 and valve 31 and one of valves 38, 36 and 34 to meter the appropriate amount of detergent into the appropriate washer. The controller will then monitor the wash cycle and as the effluent is discharged through lines 18, 22 or 24 into line 26, it will activate pump 32 and valves 44 and 43 or 45 to supply precisely the desired amount of coagulant based on the type of material being washed to the effluent as it is discharged. Thus if shirts have been washed, a relatively small amount of coagulant is added whereas if shop towels have been washed, a larger amount is required. This occurs before the effluent is combined with effluent from any other loads in the equalization tank.

The controller can also be programmed to add precise amounts of various other treatment compositions such as peroxides, enzymes, acids or bases, metal scavengers such as carbamates as well as others.

The amount of coagulant or other treatment agent will depend upon the particular agent as well as the material being laundered, the size of the load, water consumed by the particular wash formula, and the detergent. This is determined empirically by testing samples of various batches and entering this information into the controller. This is the same method that would be utilized to determine the appropriate amount of detergent to add to a particular load.

Once the coagulant or other treatment agent is added to the discharged water flowing through line 26, the water will pass through the filtration device 58. The present invention reduces the need for the equalization tank. Most commercial laundries which chemically treat their wastewater have large equalization tanks. With the present invention the equalization tank provides time for the coagulant to act. However, the size of the equalization tank may be reduced in newer units because it is not used as a mixing tank to normalize the effluent from multiple loads of laundry prior to treatment.

It should be noted that as opposed to washing a load of laundry formed primarily from one type of item, the batch could be formed from a known combination such as 25% shirts and 75% pants. Although this is less common, it would permit practicing the present invention as opposed to washing a random combination of items which would require online testing or manual control.

Likewise the heat reclamation unit is optional for use in the present invention. The flocculent added can be a constant amount determined empirically again and does not have to be adjusted based on the type of material added.

For use in the present invention, a wide variety of different coagulants can be used and there are many that are commercially available. These are organic cationic polymers such as poly(ethylene amine), poly(2-hydroxypropyl-1-N-methylamonium chloride), poly(2-hydroxypropyl-1, 1-N dimethy-ammonium chloride), poly [N-(dimethyl aminomethyl)-acrylimide], poly(2 vinyl imidazolium bisulfate), polydiallyl dimethylamonium chloride), poly(N, N-dimethylaminoethyl methacrylate), polyacrylamide, as well as polymers of melamine and formaldehyde, Suitable inorganic coagulants include ferric chloride, ferric sulfate, polyaluminum chloride, aluminum chlorohydrate, aluminum sulfate, calcium chloride, sodium aluminate, ferrous sulfate and clay solutions.

In testing the present inventon, the coagulant was a blend of diallyl dimethylamonium chloride and dialkylamine epichlorohydrin. Other commercially available coagulants work equally as well.

EXAMPLE

In order to determine the amount of coagulant required, various batches of laundry were cleaned at a commercial laundry and samples were taken and analyzed over a period of time. The amount of coagulant required for the different items is shown in Table 1.

TABLE 1

|  | Coagulant ppm |
| --- | --- |
| Color Shirts | 150 |
| Color Pants | 250 |
| HS Shirts | 175 |
| HS Pants | 100 |
| Mats | 40 |
| Exec Shirt | 50 |
| Exec Pants | 50 |
| CRT | 50 |
| Nomex | 75 |
| Cotton | 75 |
| Color Food | 225 |
| Shop Towel | 725 |
| White Linen | 475 |
| Fender Covers | 500 |
| Mops | 500 |
| Reclaim | 725 |

Once coagulant dosages are determined, the information can be inputted into the controller. When an operator washes a load of shop towels, the operator indicates to the controller that shop towels are being washed. The controller then meters the desired amount of detergent to the correct washing machine. After the load is washed or as the first step of the wash process drains, the precise amount of needed coagulant mixes directly with the effluent breaking the emulsion. It then passes down the line for further processing. The controller would add 725 ppm coagulant to the effluent.

Thus the present invention provides many different advantages. A precise control of the amount of coagulant is maintained despite the fact that various types of materials are washed in different batches. Injecting the coagulant directly into the discharge waste before it mixes with any additional waste streams eliminates the need for any online testing. Further the size of the equalization tank can be reduced for new facilities which will greatly reduce the overall capital costs.

Also the present invention permits the addition of other treatment agents to individual loads and without necessarily adding other treatment agents to all loads. This gives the laundry a more flexibility in treating effluents from a variety of different loads of laundry.

This has been a description of the present invention and the preferred mode of practicing the invention, however, the invention itself should only be defined by the appended claims wherein we claim:

1. A method of treating wastewater from a commercial laundry wherein said laundry washes loads of different items and wherein each load is formed from primarily one type of item;
   comprising metering an amount of a treatment agent and adding said treatment agent directly to wastewater from a first load;
   before said wastewater is combined with wastewater from a second load wherein the amount of treatment agent metered for said first load is determined by the type of item washed in each load.

2. The method claimed in claim 1 comprising subsequently adding said treatment agent directly to waste water for said second load before said waste water is combined with waste water for a subsequent load;
   wherein the amount of treatment agent added to said second load is different from the amount of treatment agent added to said first load.

3. The method claimed in claim 1 wherein said treatment agent is selected from the group consisting of coagulants, peroxides, enzymes, acids, bases and metal scavengers.

4. The method claimed in claim 1 wherein said treatment agent is a coagulant.

5. The method claimed in claim 4 wherein a programmed controller meters said coagulant in response to the type of item washed in said first load.

6. The method claimed in claim 5 wherein said controller also meters an amount of detergent added to said first load wherein the amount of detergent is also determined by the type of item washed in said first load.

7. A method of treating wastewater from a commercial laundry said commercial laundry having washed a first load of laundry having a known composition of items;

comprising adding a controlled first amount of coagulant to said wastewater discharged from said first load;

wherein the first amount of coagulant added to said water discharged from said first load is determined by the known composition of said first load without testing said wastewater;

subsequently washing a second load of laundry having a known composition of items which differs from said first load of laundry;

adding a controlled second amount of coagulant to said wastewater discharged from said second load:

wherein the amount of coagulant added to said wastewater discharged from said second load is determined by the known composition of said second load without testing said wastewater and wherein said first amount is different than said second amount.

* * * * *